July 12, 1932. A. G. HULME 1,867,263
CRYSTALLIZATION OF GUMS, FONDANTS, SWEETMEATS, OR THE LIKE
Filed Aug. 20, 1928

A. G. Hulme
INVENTOR

By: Marks & Clerk
Attys.

Patented July 12, 1932

1,867,263

UNITED STATES PATENT OFFICE

ANDREW GORDON HULME, OF STOCKPORT, ENGLAND, ASSIGNOR TO BAKER PERKINS COMPANY INCORPORATED, OF SAGINAW, MICHIGAN

CRYSTALLIZATION OF GUMS, FONDANTS, SWEETMEATS OR THE LIKE

Application filed August 20, 1928, Serial No. 300,882, and in Great Britain November 7, 1927.

This invention relates to a method of and means for the crystallization of gums, pastilles, fondants or the like, that is to say, the formation thereon of a crystallized covering or coating of sugar.

Hitherto it has been the practice to heat the syrup in a cooking pan by a steam coil, conveying the syrup when it has acquired the desired density through pipe lines to a cooling vessel, and subsequently to run the cooled syrup into a chamber in which the goods are immersed. Apparatus of the above character is expensive, somewhat cumbersome and requires a good deal of attention.

An object of the present invention is to provide an improved method and plant for crystallization purposes which is simplified and whereby the initial and working expenses are reduced.

According to the invention a single vessel is provided in which is carried out the improved method comprising charging the vessel with syrup, applying heat to the syrup while causing circulation or agitation thereof, allowing the syrup to cool or cooling it by aid of a cooling medium, introducing the goods for treatment into the cooled syrup and maintaining the goods therein for the period of growth of the crystals, removing the goods and finally reconditioning the syrup.

The invention also consists in a plant adapted to carry out the above process comprising a vessel having means for heating and circulating the syrup, such means being arranged to accommodate the introduction of the goods, a carrier or cage in which all the goods for treatment are contained adapted to be introduced and removed from the vessel as a whole.

The heating and circulating means preferably comprise a cylindrical or like heating element having an internal syrup-propelling device, such as a rotary helical vane (or vanes) disposed with its axis parallel with that of the vessel, the arrangement being such that around the heating element an annular space is provided between the element and the walls of the vessel for the accommodation of the carrier or cage for the goods.

Figure 1:
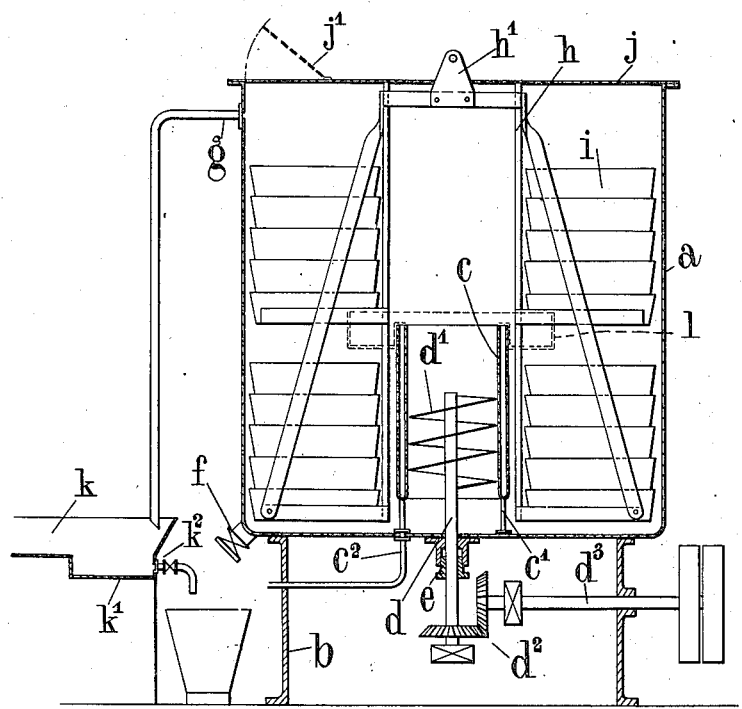
Figure 2:
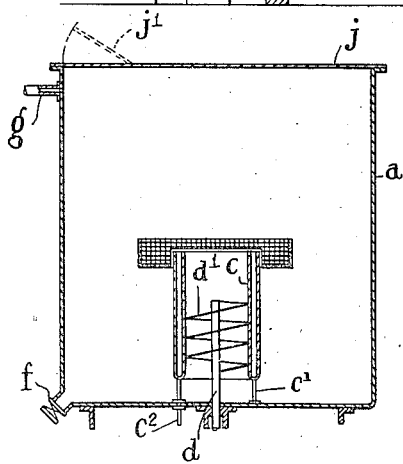

In the accompanying drawing Fig. 1 illustrates diagrammatically a sectional elevation of plant according to the invention, while Fig. 2 illustrates the use of a strainer device according to the invention.

In carrying the invention into effect according to one convenient mode, as described by way of example, a cylindrical vessel $a$ is provided and mounted upon a bed or frame $b$ at a suitable height above the floor level. Within the container and clear of the floor thereof a cylindrical heating element $c$ is provided. This element is preferably in the form of a double-walled cylinder (presenting a smooth exterior surface) in which steam may be circulated. The element may conveniently be supported upon a series of posts, such as $c'$, so that it is clear of the bottom of the vessel to provide a path for the circulation of the syrup. Steam may be supplied to the element through a conduit $c^2$ which may be a hollow supporting post, or by any other convenient arrangement.

Within the heating element a vertical shaft $d$ is mounted in a footstep bearing and passed through a suitable stuffing box $e$ in the bottom of the vessel. This shaft has mounted upon it a continuous helical vane $d'$ or a plurality of like propeller elements. The shaft $d$ may be rotated through bevel gear $d^2$ from a drive shaft $d^3$ or any other suitable means may be provided for imparting rotation to the shaft $d$. The relative arrangement of the element $c$ and the helical vane $d'$ should be such that the syrup is caused to be circulated thereby, passing out from the centre over the top of the element $c$ and returning towards the centre adjacent the floor of the vessel up through the lower open end of the heating unit. The vessel may be provided with a suitable drain cock $f$ and an overflow connection $g$.

The cylindrical element $c$ mounted as it is around the axis of the vessel, provides an annular space between itself and the walls, which is designed for the accommodation of a carrier or cage $h$ for the goods. This carrier is of openwork structure having a central space corresponding with the size of the heating element and having suitable shelves or brackets for the reception of a series or sets of trays $i$ which are conveniently arranged one above the other. The cage or carrier $h$ is adapted to be raised and lowered into the vessel as a whole so that all the goods are introduced and removed together. For this purpose the cage may be provided with a part $h'$ to which hoisting mechanism may be secured.

For the reception of the cage with the trays of goods after such has been removed from the syrup, a platform $k$ may be provided adjacent the cylinder $a$ so that the surplus syrup may be drained from the goods. The tray may have a depression or pocket $k'$ for the collection of the drained syrup which may be periodically drawn off at a cock $k^2$.

The vessel $a$ may have any suitable form of lid of the loose or hinged type. A convenient form of lid, such as $j$, may rest upon the top of the vessel $a$ and have a slot through which the part $h'$ may protrude, the arrangement being such that when the cage is removed the lid of the vessel may, if desired, also be carried away with it. The lid $j$ of the vessel may have a suitable inspection trap $j'$. A strainer or annular basket-like sieve $l$ may be provided which is adapted to be hung or hooked over the upper end of the heating element so that it may lie in the path of the circulating syrup.

In operating the plant according to the method herein indicated, the vessel $a$ is charged with a suitable quantity of syrup. The level of the charge of syrup in the vessel $a$ should well cover the heating element $c$ and be such that when the goods are introduced the level thereof is raised such as to ensure total immersion of the goods.

The charge of syrup is heated by the admission of steam to the heating element $c$ and its temperature suitably controlled. The heat treatment is carried on simultaneously with the circulation of the liquid which is effected by the rotation of the helical vane $d'$. Heating and circulation are carried on concurrently until the syrup has acquired the temperature predetermined for the particular goods under treatment. At the termination of the heat treatment and before cooling commences, the strainer $l$ is introduced over the upper part of the heating element so that it is interposed in the circulation path. The circulation of the syrup is continued for a short period after the steam has been turned off, in order that any stray crystals which have not been dissolved or other particles may be caught by the strainer and removed from the liquid, as otherwise such particles are liable to cause an undesirable growth of crystals on the bottom and sides of the pan.

The strainer $l$ is removed and the syrup within the vessel is allowed to stand for a period necessary for it to get cold. The cooling period may be lessened in some circumstances by circulating cold water through the heating element.

The goods are arranged in the trays $i$ which are stacked in the cage $h$. This cage is then lowered into the vessel and allowed to stand for a sufficient period to allow the growth of crystals on the goods to the degree required for the crystallized coating. When the crystallization period is terminated the cage is raised and deposited upon the draining platform $k$. After the removal of the trays, the residual syrup in the vessel is added to or replenished and again heated, or otherwise reconditioned.

Although above the invention has been described with reference to a steam-heated element, it will be understood that this may be substituted by an electrical heating element and, further, that this heating element, although preferably arranged in the fashion described, need not necessarily be located centrally. For example, the heat may be applied through the medium of a double floor to the vessel and separate circulating means employed. While it is convenient to mount the circulating means through the floor of the device such may, if desired, be introduced through the top or upper end of the vessel and be raised out of the operative position when it is desired to introduce the goods. Where a fixed central heating element is not employed, the cage for the goods may occupy the whole of the vessel. The circulation of the liquid may take place with a central upward flow and a return by way of the bottom, or the circulation may be in the reverse order, and it is to be understood that the invention is not confined with reference to the particular kind of circulating or stirring element employed.

Having now described my invention, what I claim as new and desire to secure by Letters Patent is:—

1. Plant for use in crystallization of the kind indicated comprising a vessel for containing the crystallization syrup, means associated with the vessel for heat treating the syrup, means adapted for causing the circulation or agitation of the syrup during the heating period means projecting through the bottom of the vessel for driving said circulating or agitating means, and a carrier for the goods adapted to be introduced into and removed from the top of the vessel.

2. Plant for use in crystallization of the kind indicated, comprising a vessel for containing the crystallization syrup, an element for heating the syrup arranged about the axis of the vessel and affording an annular space for the accommodation of the goods, means adapted for causing the circulation or agitation of the syrup during the heating period, means projecting through the bottom of the vessel for driving said circulation or agitation means, and an annular carrier for the goods adapted to be introduced into and removed from the vessel.

3. Plant for use in crystallization of the kind indicated comprising a vessel for containing the crystallization syrup, a cylindrical, smooth-walled element for heating the syrup arranged about the axis of the vessel and affording an annular space for the accommodation of the goods, means adapted for causing the circulation or agitation of the syrup during the heating period, means projecting through the bottom of the vessel for driving said circulation or agitation means, and an annular carrier for the goods adapted to be introduced into and removed from the vessel.

4. Plant as claimed in claim 3 wherein the cylindrical element is double walled and means are provided for supplying it with a heating or cooling medium.

5. Plant as claimed in claim 2, wherein the circulating means comprise a vaned element having its axis parallel with the axis of the vessel.

6. Plant for use in crystallization of the kind indicated comprising a vessel for containing the crystallization syrup, a cylindrical heating element arranged about the axis of the vessel and affording an annular space for the accommodation of the goods, means arranged within the cylindrical element adapted for causing the circulation or agitation of the syrup during the heating period, means projecting through the bottom of the vessel for driving said circulation or agitation means, and an annular carrier for the goods adapted to be introduced into and removed from the vessel.

7. Plant as claimed in claim 6, wherein the circulating means are carried by a rotary shaft projecting through the bottom of the vessel.

8. Plant for use in crystallization of the kind indicated comprising a vessel for containing the crystallization syrup, an open-ended heating element spaced from the floor of the vessel and affording an annular space for the accommodation of goods, means located within the heating element, for causing circulation of the syrup during the heating period, means projecting through the bottom of the vessel for driving said circulation or agitation means, and an annular carrier for the goods adapted to be introduced into and removed from the vessel, the arrangement of the circulating means being such that the syrup is circulated out at one end of the heating element and in at the other end thereof.

9. Plant for use in crystallization of the kind indicated, comprising a vessel for containing the crystallization syrup, means associated with the vessel for heat treating the syrup and arranged to afford an annular space for accommodating the goods, means adapted for causing the circulation of the syrup during the heating period, means projecting through the bottom of the vessel for driving said circulation or agitation means, a strainer adapted to be interposed in the circulation path of the syrup, and an annular carrier for the goods adapted to be introduced into and removed from the vessel.

10. Plant for use in crystallization of the kind indicated, comprising a vessel for containing the crystallization syrup, a cylindrical heating element arranged about the axis of the vessel and affording an annular space for the accommodation of the goods, means arranged within the cylindrical element adapted for causing the circulation or agitation of the syrup during the heating period, and a strainer adapted to be interposed in the circulation path of the syrup and detachably to be hung upon the upper end of the heating element, and a carrier for the goods adapted to be introduced into and removed from the vessel.

11. Plant for use in crystallization of the kind indicated comprising a vessel for containing the crystallization syrup, a cylindrical, smooth and double-walled heating element spaced from the floor of the vessel and arranged about the axis of the latter and affording an angular space for the accommodation of the goods, means for supplying the element with either a heating or cooling medium, a vaned element having its axis parallel with the axis of the vessel and carried by a rotary shaft introduced through the bottom of the vessel, said vaned element causing circulation of the syrup out at one end of the cylinder and in at the other end thereof, a strainer adapted to be interposed in the circulation path of the syrup and adapted to be detachably hung upon the upper end of the cylindrical element and a carrier for the goods adapted to be introduced into and removed from the vessel.

In testimony whereof I have signed my name to this specification.

ANDREW GORDON HULME.